US010990550B1

(12) United States Patent
Juenger et al.

(10) Patent No.: US 10,990,550 B1
(45) Date of Patent: Apr. 27, 2021

(54) CUSTOM CHIP TO SUPPORT A CPU THAT LACKS A DISPLAYPORT INPUT

(71) Applicant: Dell Products L. P., Round Rock, TX (US)

(72) Inventors: Randall E. Juenger, Georgetown, TX (US); Arnold Thomas Schnell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/815,050

(22) Filed: Mar. 11, 2020

(51) Int. Cl.
*G06F 13/38* (2006.01)
*G06F 13/42* (2006.01)
*G09G 5/00* (2006.01)

(52) U.S. Cl.
CPC ........ *G06F 13/385* (2013.01); *G06F 13/4291* (2013.01); *G09G 5/006* (2013.01); *G06F 2213/0038* (2013.01); *G06F 2213/0042* (2013.01)

(58) Field of Classification Search
CPC .......................... G06F 13/385; G06F 13/4291
See application file for complete search history.

(56) References Cited

U.S. PATENT DOCUMENTS

2016/0335222 A1* 11/2016 Schnell ............... G06F 13/4286
2016/0357699 A1* 12/2016 Shamarao ............. G06F 13/385

* cited by examiner

*Primary Examiner* — David E Martinez
(74) *Attorney, Agent, or Firm* — Campbell Stephenson LLP; S. Naimpally (57) ABSTRACT

In some examples, a logic device may be connected to: (i) a ThunderBolt (TBT) output of a CPU that lacks a DisplayPort (DP) input and (ii) a DP output of a GPU. The logic device may determine a presence of a video signal, e.g., either: (1) TBT video from the CPU or (2) DP video from the GPU. The logic device may re-time the video signal to create re-timed video and output the re-timed video using a USB-C port. If the logic device determines that the video signal is DP, then the logic device may select a DisplayPort Alternate Mode of the USB-C port and output the re-timed video signal using four differential pairs of the USB-C port. If the logic device determines that the video signal is TBT, then the logic device may output the re-timed video signal using two differential pairs of the USB-C port.

17 Claims, 5 Drawing Sheets

CUSTOM CHIP TO SUPPORT A CPU THAT LACKS A DISPLAYPORT INPUT

BACKGROUND OF THE INVENTION

Field of the Invention

This invention relates generally to video signals and, more particularly, to multiplexing Thunderbolt and DisplayPort signals when using a central processing unit (CPU) that does not include a DisplayPort input.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As mobile central processing units (CPUs) evolve, future CPUs used in mobile devices may use an integrated Thunderbolt controller. To maintain the CPU package size, the pins for the Display Port "in" (DP-in) may be removed from the future CPUs. For example, some CPUs include a DP-in while other CPUs do not include a DP-in. The lack of a DP-in creates a problem because driving display devices using a discrete graphics processing unit (GPU) through a universal serial bus Type-C (USB-C) connector means that an additional Thunderbolt controller with DP-in must be included in the motherboard, thereby increasing chip count, motherboard size, and cost. Likewise, the integrated Thunderbolt controller cannot be utilized since the CPU has no inputs to receive the GPU display channels.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a logic device may be connected to: (i) a ThunderBolt (TBT) output of a CPU that lacks a DisplayPort (DP) input and (ii) a DP output of a GPU. The logic device may determine a presence of a video signal, e.g., either: (1) TBT video from the CPU or (2) DP video from the GPU. The logic device may re-time the video signal to create re-timed video and output the re-timed video using a USB-C port. If the logic device determines that the video signal is DP, then the logic device may select a DisplayPort Alternate Mode of the USB-C port and output the re-timed video signal using four differential pairs of the USB-C port. If the logic device determines that the video signal is TBT, then the logic device may output the re-timed video signal using two differential pairs of the USB-C port.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a custom chip to receive a ThunderBolt (TBT) output from a central processing unit (CPU) and from a DisplayPort (DP) output from graphics processing unit (GPU). For example, the CPU may lack a DP-in (e.g., referred to as a DP-less CPU). If the custom chip was not used, a manufacturer would have to use an external TBT chip to receive the DP signal, thereby increasing the cost and complexity to support the DP-less CPU.

The custom chip may be an integrated circuit (IC) or the like that is implemented using one or more technologies (e.g., embedded controller, field programmable gate array (FPGA), microcontroller with custom firmware, or other programmable logic device). The custom chip may be capable of receiving one of (i) a TBT signal from a CPU or (ii) a DP signal from a GPU, re-timing the signal, and outputting the re-timed signal using a universal serial bus type-C (USB-C) port to a display device. A TBT lane uses a transmit (TX) differential pair and a receive (RX) differential pair, which uses 4 pins. A DP lane uses one TX differential pair with zero RX differential pairs, so a DP lane uses two pins. USB-C has 4 differential pairs (e.g., 8 pins) that can be used. Thus, USB-C can provide 2 TBT lanes or, using DP Alternate Mode, 4 DP lanes using the 4 differential pairs.

TBT is a tunneling protocol that can carry different signals (e.g., USB, DP, TBT and the like). TBT supports 2-way communication. For example, when TBT uses USB-C (e.g., the TBT signal is USB-C compliant), four USB-C pins (e.g., differential pairs TX0, TX1) may be used to transmit a signal and four USB-C pins (e.g., differential pairs RX0, RX1) may be used to receive a signal. In contrast, DP is a pure transmission protocol and can use all 8 pins (e.g., differential pairs RX0, RX1, TX0, TX1) of USB-C, e.g., using DP Alternate ("Alt") mode to transmit. Thus, for a given transmission speed, DP can achieve up to double the output of TBT when using USB-C because DP has access to twice the pins (e.g., 8 vs 4) as compared to TBT. In contrast, if an external TBT chip was used with a DP-less CPU, then to support DP, the DP output speed is constrained because TBT uses 2 USB-C differential pairs for transmitting and 2 differential pairs for receiving. Thus, by using the custom chip described herein, a DP signal can be transmitted using up to 4 USB-C differential pairs (e.g., up to 4 DP lanes), thereby enabling up to double the transmission speeds as compared to TBT. Furthermore, the custom chip can handle the DP-out of a GPU at full speed, without using tunneling, to accommodate CPUs that lack a DP-in.

Therefore, using the custom chip described herein provides several advantages. First, the custom chip is cheaper than a dedicated TBT chip that can accept a DP signal as input. Second, a manufacturer of a computer motherboard that uses a DP-less CPU can output a DP signal using up to twice the number of pins (e.g., providing up to double the throughput as compared to using a dedicated TBT chip), thereby providing a mechanism to drive the DP channel from the GPU instead of the CPU, which provides a much better video display and graphic performance experience to the user. In this way, the manufacturer can support multiple high resolution (e.g., either 3840×2160 pixels or 4096×2160 pixels) display devices. Third, the manufacturer does not have to validate the GPU with the CPU manufacturer (adding additional cost) because the custom chip is not modifying the signals in any way. This avoids finger pointing between a first manufacturer (e.g., Intel®) of a CPU and second manufacturer (e.g., Nvidia® or AMD®) of the GPU if video issues arise and simplifies the process of readying a motherboard of a portable computing device for manufacturing.

As an example, a logic device may include a multiplexer and a re-timer. The logic device may be connected to: (1) a ThunderBolt (TBT) out of a central processing unit that lacks a DisplayPort (DP) input and to (2) a DisplayPort out of a graphics processing unit. The logic device may be configured to determine that a video signal is present. The video signal may comprise either: (1) a Thunderbolt video signal output by the central processing unit or (2) a DisplayPort video signal output by the graphics processing unit. The logic device may re-time the video signal to create a re-timed video signal and output the re-timed video signal over a universal serial bus Type C port (USB-C). For example, if the logic device determines that the video signal comprises the DisplayPort video signal that is output by the graphics processing unit, then the logic device may select a DisplayPort Alternate Mode of the universal serial bus Type C port and output the re-timed video signal using up to eight pins of the universal serial bus Type C port. In the case of a DisplayPort video signal, the universal serial bus Type C port may send the re-timed video signal to: (i) a 16k display device having a resolution of 15360×8640, at 60 Hertz, (ii) two 8k display devices, each having a resolution of 7680×4320, at 120 Hertz, (iii) two 4k display devices, each having a resolution of 3840×2160, at 144 Hertz, (iv) three 10k display devices, each having a resolution of 10240×4320, at 60 Hertz, or (v) three 4k display devices, each having a resolution of 3840×2160, at 90 Hertz. As another example, if the logic device determines that the video signal comprises the Thunderbolt video signal output by the central processing unit, then the logic device may output the re-timed video signal using four pins of the universal serial bus Type C port. In the case of a ThunderBolt video signal, the re-timed video signal may be sent to either (1) a display device having a resolution of 3840×2160 at 120 Hertz or (2) two display devices, each having a resolution of 3840×2160, at 60 Hertz. The logic device may receive a frequency sweep from a test generator to determine a transmission capability of the logic device. The logic device may include a re-timer to re-time the video signal. The re-timer may receive a timing signal from an external clock and re-time the video signal using the timing signal to create the re-timed video signal.

Figure 1:
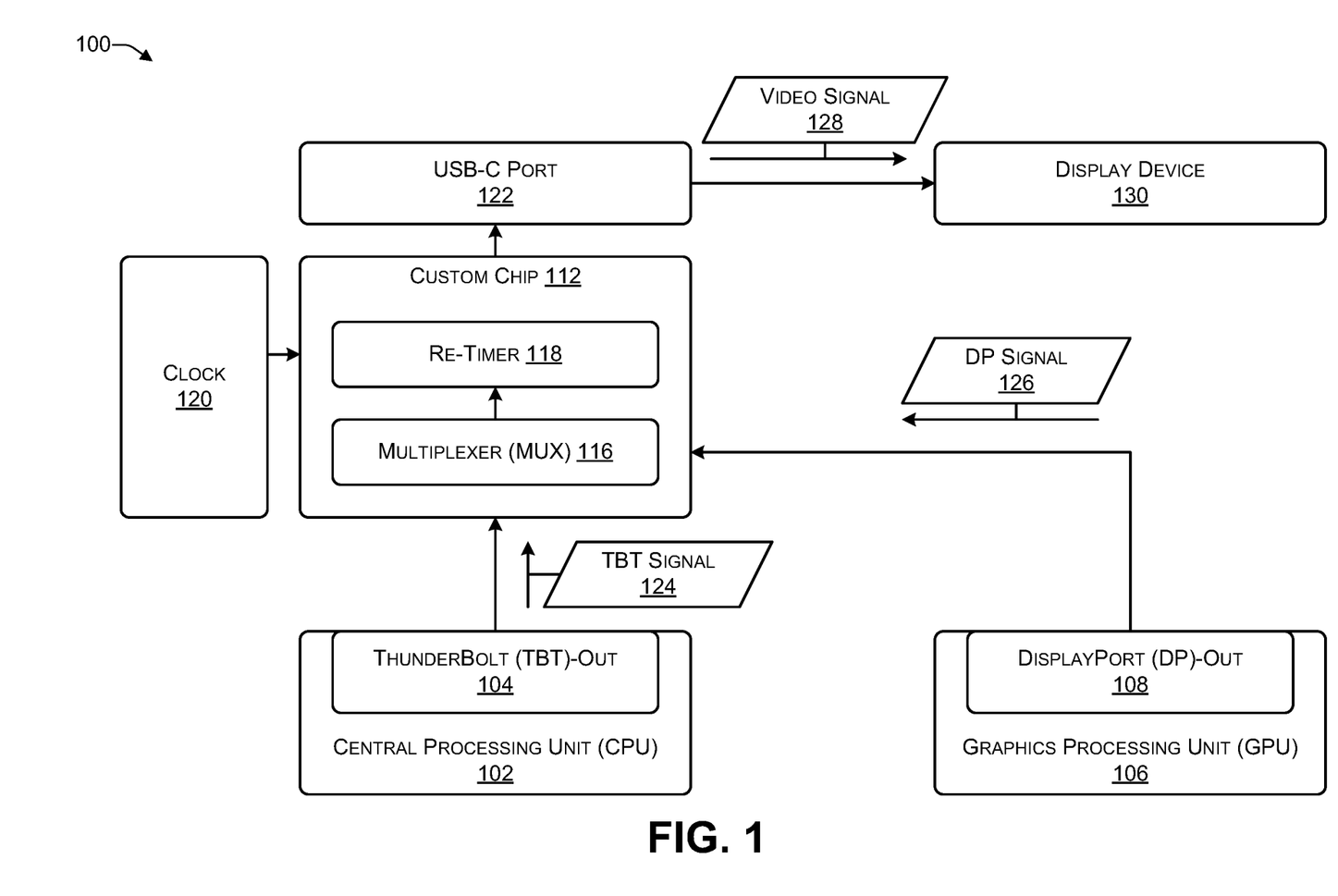
FIG. 1 is a block diagram of an architecture of a computing device motherboard that supports DisplayPort and ThunderBolt, according to some embodiments.

FIG. 1 is a block diagram of an architecture 100 of a computing device motherboard that supports DisplayPort and ThunderBolt, according to some embodiments. The architecture 100 illustrates a portion of the components of a motherboard of a computing device, such as a smartwatch, a smartphone, a tablet, a 2-in-1 (e.g., a tablet to which a keyboard can be attached to create a laptop), a laptop, or the like. For ease of understanding, the relevant components of the motherboard are illustrated in FIG. 1. However, it should be understood that other relevant components normally found in a motherboard may be present.

In FIG. 1, a CPU 102 includes a TBT-out 104. The CPU 102 may be a DP-less CPU that does not include a DP-in. A GPU 106 may include a DP-out 108.

A custom chip 112 may include a multiplexer ("mux") 116 and a re-timer 118. The re-timer 118 may be driven by an external clock (e.g., also referred to as a crystal or an oscillator). The custom chip 112 may use 4 pins of a USB-C port 122, e.g., 2 pins to receive and 2 pins to transmit when providing TBT and 8 pins to transmit when providing DP.

The custom chip 112 may receive a TBT signal 124 from the TBT-out 104 of the CPU 102. The custom chip 112 may receive a DP signal 126 from the DP-out 108 of the GPU 106. If the TBT signal 124 is present, the multiplexer 116 may use the re-timer 118 to retime the TBT signal 124 and output the re-timed signal as a video signal 128 from the USB-C port 122 (e.g., using two lanes=two differential pairs=four pins). If the DP-out signal 126 is present, the multiplexer 116 may use the re-timer 118 to retime the DP signal 126 and output the re-timed signal as the video signal 128 from the USB-C port 122 (e.g., using four lanes=four differential pairs=eight pins). The video signal 128 may be sent to at least one representative display device 130. Of course, the video signal 128 may be used to drive more than one display device. The display device 130 may include a monitor, virtual reality glasses, or another type of display device that is capable of displaying the video signal 128.

Thus, on a motherboard of a computing device, a custom chip may receive a TBT-out from a DP-less CPU and a DP-out from a GPU. Based on which signal is present, the custom chip may use a re-timer to re-time the signal to create a re-timed signal and output the re-timed signal as a video signal to one or more display devices. In this way, a speed of the DP-out is not restricted by tunneling the DP-out using TBT. The custom chip may save costs as compared to using an external TBT chip to receive both the TBT-out from the CPU and the DP-out from the GPU. In addition, the custom chip provides an inexpensive way in which to support both DP and TBT and avoids having to perform a certification of the solution with either the CPU manufacturer or the GPU manufacturer.

Figure 2:
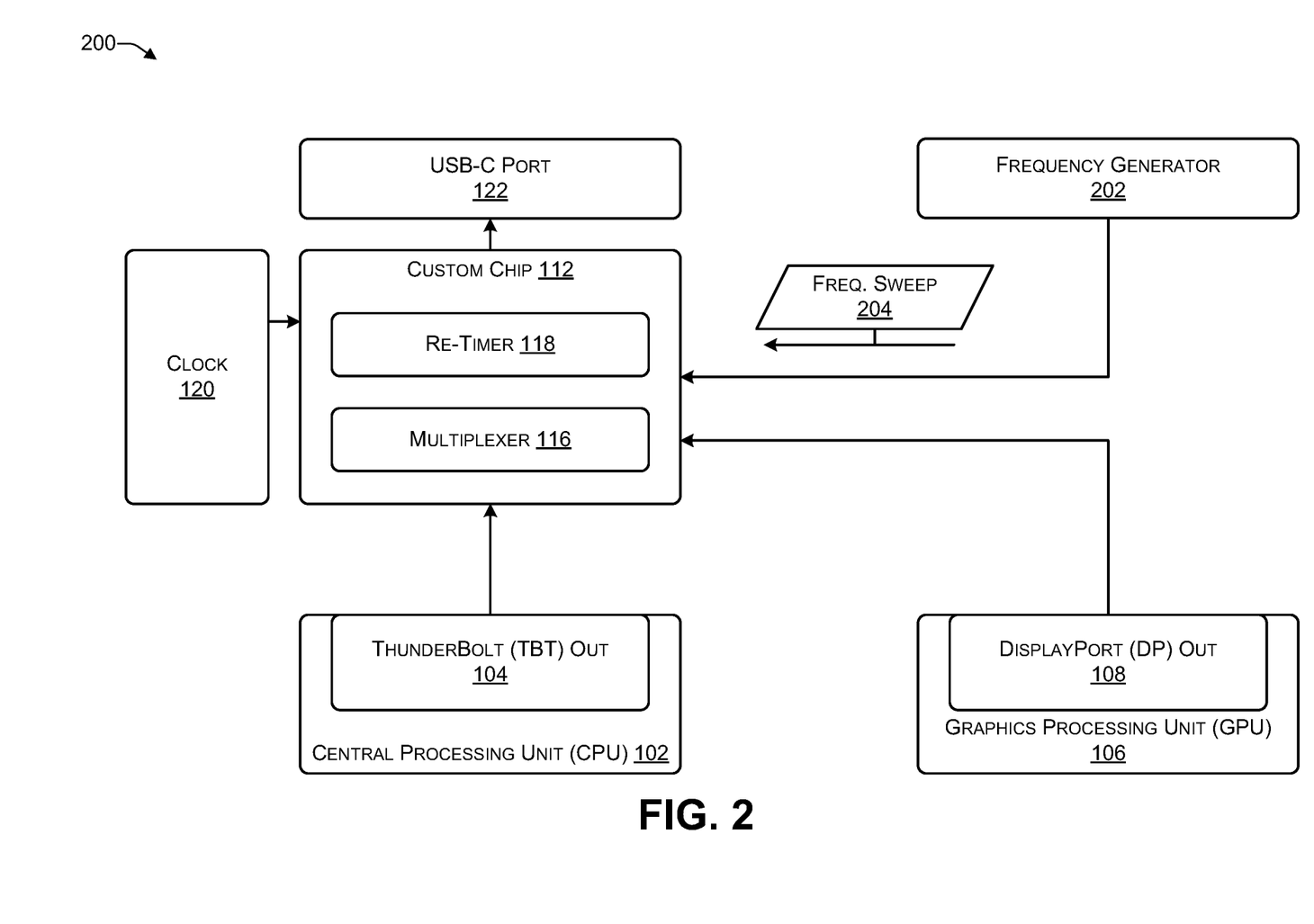
FIG. 2 is a block diagram of an architecture that includes a frequency generator, according to some embodiments.

FIG. 2 is a block diagram of an architecture 200 that includes a frequency generator, according to some embodiments. A frequency generator 202 may be used to perform a frequency sweep 204 of the custom chip 112. For example, the frequency sweep 204 may be used to characterize the transmission line channel from end-to-end. As another example, the frequency sweep 204 may be used during manufacturing to perform a periodic quality check or to debug the architecture 200.

Figure 3:
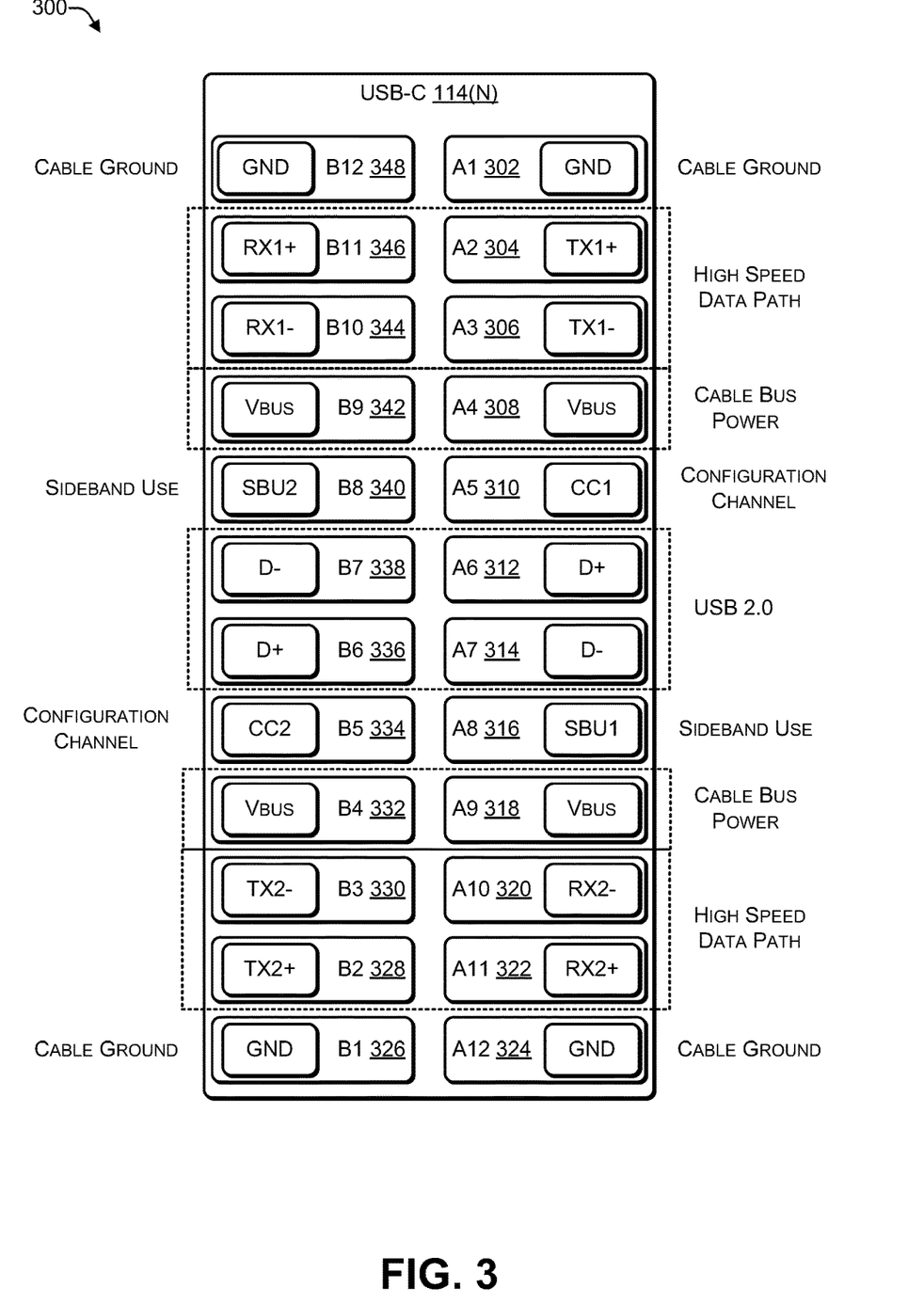
FIG. 3 is a block diagram of an architecture that includes pin assignments of a representative USB-C connector according to some embodiments.

FIG. 3 is a block diagram of an architecture 300 that includes pin assignments of a representative USB-C connector (e.g., receptacle) according to some embodiments. For example, the representative USB-C connector 114(N) includes 24 pins, with an A-side having 12 pins and a B-side having 12 pins. The A-side pins include A1 302, A2 304, A3 306, A4 308, A5 310, A6 312, A7 314, A8 316, A9 318, A10 320, A11 322, and A12 324. The B-side pins include B1 326, B2 328, B3 330, B4 332, B5 334, B6 336, B7 338, B8 340, B9 342, B10 344, B11 346, and B12 348.

A USB cable that is compliant with USB Type-A ("USB-A") and USB Type-B ("USB-B"), is a directional cable, with each end of the cable having a physically different plug. The USB-A connector has a rectangular shape. The USB-B connector has a square shape, while the smaller mini-B and micro-B variants have a trapezoidal shape.

In a USB system, a tree-based structure is formed, with a single USB host at the root (typically the host device, such as a personal computer or laptop), and one or more devices (e.g., memory card etc.) as leaves off of the root. In a conventional USB system, a USB-A connector connects closer to the root, and may be referred to as a downstream facing port (DFP). A USB-B connector connects further away from the root, and may be referred to as an upstream facing port (UFP). Such a tree-based architecture prevents loops and other issues because a user cannot set up an incorrect USB tree due to the physically different connectors.

USB-C replaces both USB-A and USB-B, thereby enabling symmetrical and reversible USB-C cables while maintaining the same tree structure, e.g., one USB host and one or more USB devices. Instead of a using physically different connector and plug to identify the direction of data and power, a USB-C device indicates the device's role (e.g., the device's characteristics, the device's functionality, the type of signals that the device is configured to send and/or receive, and the like) electrically through a Configuration Channel (CC). The CC is used in the discovery, configuration and management of connections across a USB Type-C cable. For example, when an external device is connected to a USB connector of a computing device (e.g., host device), the USB connector may provide discovery data on the CC indicating that an external device has been discovered. The external device negotiates with the host device, via the CC, as to the type (e.g., voltage and amperage) of power delivery to provide, the type of data traffic (e.g., USB 1.0, USB 2.0, number of lanes of DP traffic, etc.) to provide or expect, and the like. The external device and the host device may manage the connection, via the CC, by re-negotiating the power delivery, re-negotiating the type of data traffic, etc.

Pins A1 302, A12 324, B1 326, and B12 348 provide cable ground. Pins A2 304, A3 306, B10 344 and B11 346 may provide a first high speed data path, with the A pins 304, 306 used for transmitting and the B pins 344, 346 used for receiving. When DP Alternate mode is specified, pins A2 304, A3 306, B10 344 and B11 346 may be used for video data, such as Display Port (DP). Pins A10 320, A11 322, B2 328 and B3 330 may provide a second high speed data path, with the A pins 320, 322 used for receiving and the B pins 328, 330 used for transmitting. When DP Alternate mode is specified, one or more of pins A10 320, A11 322, B2 328 and B3 330 may be used for video data, such as providing up to four lanes of Display Port (DP). Pins A4 308, A9 318, B4 332, and B9 342 may be used to provide cable bus power. Pins A6 312, A7 314, B6 336, and B7 338 may be used to provide USB 2.0 functionality.

Each USB Type-C port has two CC pins, oriented in such a way that regardless of the orientation of the cable, the CC pin in the cable plug connects with one of the two CC pins. Each USB-C cable has a single CC wire. Thus, either pin A5 310 or pin B5 334 may be used as the CC. Typically, one of the pins A5 310 or B5 334 is used as the CC while the other pin is used as Vconn (e.g., to provide power).

A port controller, such as the port controller 206 of FIG. 2, may monitor whichever of the pins A5 310 and B5 334 is being used as the CC to determine the characteristics and functionality of the external device and to determine which type of signal(s) the external device is configured to send and/or receive.

When a DFP (e.g., USB host) is connected to a UFP (e.g., an external USB device) using a cable, the CC on both sides are connected together, and the shared CC line has both a pull-up and a pull-down on it. Both the DFP and UFP read the voltage on the CC line and can recognize that a connection has just been made when the voltage becomes a predictable value. By monitoring the voltage on both pins A5 310 and B5 334, a host or external device can determine an orientation of the USB cable and route the other pins appropriately. There is a pullup resistor Rp on the DFP side and a pulldown resistor Rd on the UFP side. Before an external device is connected to a USB-C port, the DFP VBUS has no output. After an external device is connected to the USB-C port, e.g., connecting the host device (DFP) with the external device (UFP), the CC pin in the DFP detects the voltage drop at the CC pin caused by Rd, thereby notifying the DFP (via the CC) that the UFP has been connected.

Besides DFP and UFP, a dual-role port (DRP) is possible. A DRP can, depending on the circumstances, can automatically (e.g., without human interaction) configure itself as a DFP or as a UFP. For example, when a DRP is connected to a DFP, the DRP can change itself to be a UFP. When the DRP is connected to a UFP, the DRP can change itself to be a DFP. When two DRP are connected together, one DRP will randomly change to be a DFP and the other DRP will change to be a UFP.

In USB-C, the external device can negotiate power delivery, including between 5 volts (default) up to 20 volts and up to 5.0 amps (A). The CC may be used to identify the power capabilities of a host device. Default USB Power uses a 56kΩ pullup, 1.5 A uses a 22kΩ pullup, and 3.0 A uses a 10kΩ pullup. The latter two modes are used for non-legacy USB Type-C ports and cables when the power supply has satisfied the electrical requirements to meet a 1.5 A or 3.0 A load. Default USB Power means 500 milliamps (mA) for USB 2.0 or 900 mA for USB 3.1. Default USB Power also enables negotiating, using the data lines D+ and D−, using any of the protocols that comply with USB A-to-Micro-B cables.

The CC may be used to communicate Vendor Defined Messages (VDMs). An identifier (ID) may be included in a sixteen-bit ID field in each VDM. There are two types of IDs: Standardized ID (SID) and Vendor specific ID (VID). SID and VIDs are assigned by a standards body (e.g., the USB Implementers Forum (USB-IF)). The USB-IF assigns SIDs to standards groups and assigns VIDs to companies. The SID refers to a specific type of alternate mode of operation, such as the Display Port Alternate Mode ("DP Alt Mode" promulgated by the Video Electronics Standards Association (VESA)) and the Mobile High-Definition Link (MHL) Alt Mode (promulgated by the MHL consortium). Companies can use their unique VID to establish a proprietary link that works between their own UFP and DFP. For example, an external device made by Dell® may establish a proprietary link with a Dell® computing device (e.g., desktop computer, laptop computer, or tablet computer). The proprietary link may be used to provide features that are not available with external devices made by other companies. In order to enter or exit an Alternate (Alt) mode, structured VDMs may be used. The structured VDMs may have well-defined but extensible commands and are modal in behavior. For example, two commands are "Enter Mode" and Exit Mode." Once an Alt Mode is enabled, specialized commands and data, known as unstructured VDMs, may be used to provide vendor-customized formats.

In some cases, the USB-C port may determine a device class of the external device and determine the signals that the external device is configured to send and/or receive based on the device class. Examples of USB device classes are provided in Table 1.

TABLE 1

USB Device Classes

| Usage | Device Class | Description (examples) |
|---|---|---|
| Interface | Audio | Speaker, microphone, sound card, Musical Instrument Digital Interface (MIDI), etc. |
| Both | Communications | Modem, Ethernet adapter, Wi-Fi adapter, RS232 serial adapter, etc. Used with communications device class (CDC below. |
| Interface | Human interface device (HID) | Keyboard, mouse, joystick, etc. |
| Interface | Physical Interface Device (PID) | Force feedback joystick, haptic feedback device, etc. |
| Interface | Image | Webcam, scanner, and other devices using Media Transfer Protocol (MTP) or Picture Transfer Protocol (PTP) |
| Interface | Printer | Laser printer, inkjet printer, 3D printer, etc. |
| Interface | Mass storage | USB flash drive, memory card reader, digital audio player, digital camera, external drive, and other USB Mass Storage (UMS) devices |
| Device | USB hub | Full bandwidth hub |
| Interface | CDC-Data | Used with Communications above |

TABLE 1-continued

USB Device Classes

| Usage | Device Class | Description (examples) |
|---|---|---|
| Interface | Smart Card | USB smart card reader etc. |
| Interface | Security | Fingerprint reader, retinal scanner, etc. |
| Interface | Video | Webcam, etc. |
| Interface | Personal healthcare | Pulse monitor (watch), etc. device class (PHDC) |
| Interface | Audio/Video (AV) | Webcam, TV |
| Device | Billboard | Describes USB Type-C alternate modes supported by device |
| Both | Diagnostic Device | USB compliance testing device |
| Interface | Wireless Controller | Bluetooth adapter, Remote Network Driver Interface Specification (RNDIS), etc. |
| Both | Miscellaneous | ActiveSync device |
| Interface | Application-specific | IrDA Bridge, USB Test & Measurement Class (USBTMC), USB Device Firmware Upgrade (DFU), etc. |
| Both | Vendor-specific | Indicates that a device needs vendor-specific drivers |

The port controller associated with a USB-C connector is capable of providing several different types of data via the CC. First, the port controller may provide (via the CC) information indicating when an external (e.g., downstream) device is attached or detached. Second, the port controller may provide (via the CC) information as to the role (or device class) of each device, e.g., identifying which is the host device and which is the external (downstream) device. Third, the port controller may provide (via the CC) information identifying an orientation of the USB-C cable. Fourth, the host device and the external device may communicate via the CC to detect and negotiate the amount of power (e.g., amount of amperage, amount of voltage, or both) to be provided via the USB-C cable in accordance with the USB Power Delivery Specification.

In FIG. 1, if the custom chip 112 detects a presence of the TBT signal 124 from the TBT-out 104 of the CPU 102, then A2 304, A3 306 may be used to transmit (TX1) and B10 344, B11 346 (RX1) may be used to receive. If the custom chip 112 detects a presence of the DP signal 126 from the DP-out 108 of the GPU 106, the custom chip 112 may specify an Alternate mode and use A2 304, A3 306, B10 344, and B11 346 to transmit the DP signal 126 through the USB-C port.

When the USB-C plug is reversed, if the custom chip 112 detects a presence of the TBT signal 124 from the TBT-out 104 of the CPU 102, then the custom chip 112 may use A10 320, A11 322, B2 328 and B3 330 to provide a high speed data path, with A10 320, A11 322 used for receiving (RX2) and the B2 328, B3 330 used for transmitting (TX2). If the custom chip 112 detects a presence of the DP signal 126 from the DP-out 108 of the GPU 106, the custom chip 112 may specify an Alternate mode and use A10 320, A11 322, B2 328 and B3 330 to transmit the DP signal 126 through the USB-C port.

Figure 4:
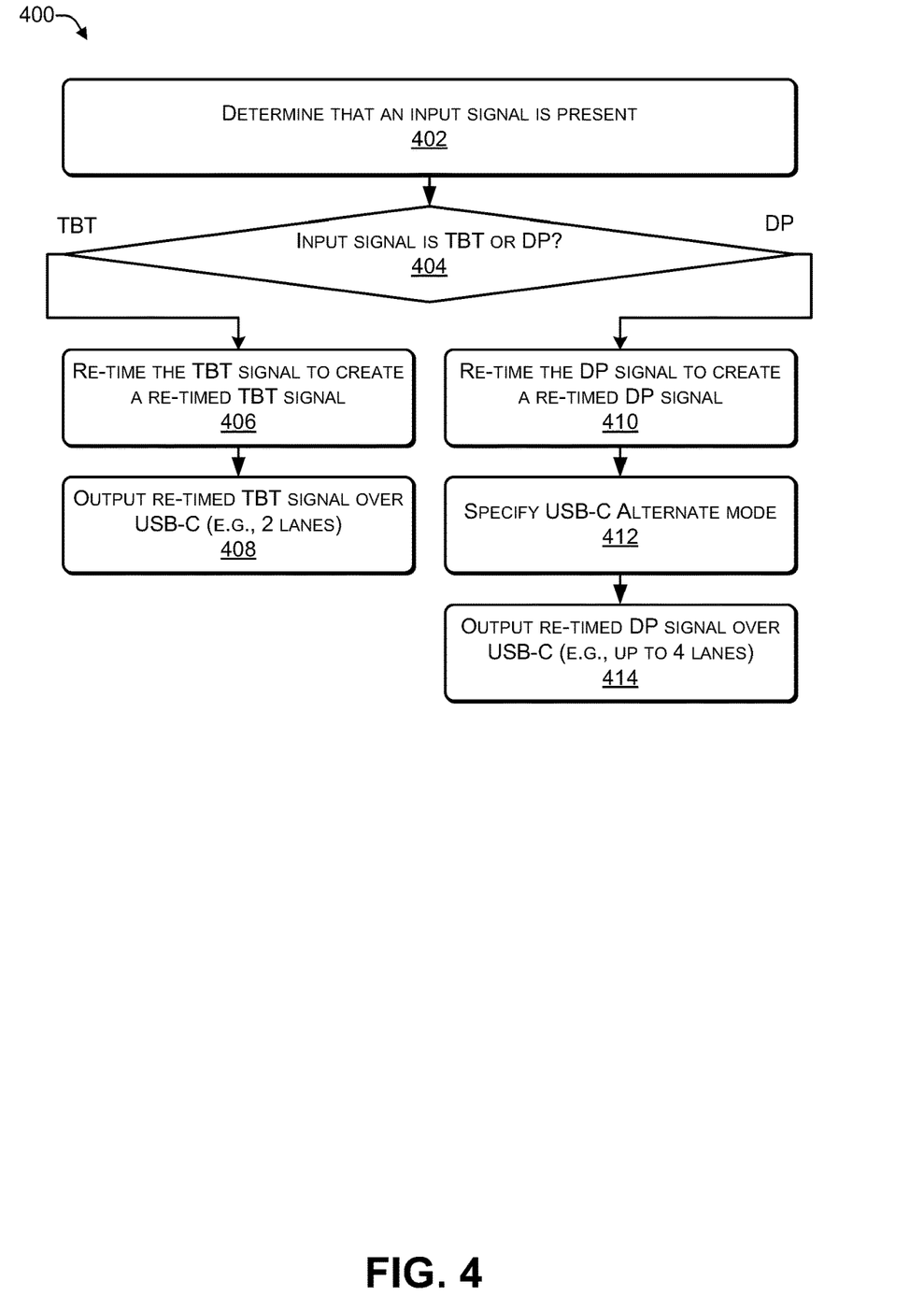
FIG. 4 is a flowchart of a process that includes re-timing a video signal, according to some embodiments.

In the flow diagram of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIG. 1, 2, or 3 as described above, although other architectures, models, frameworks, systems and environments may be used to implement these processes.

FIG. 4 is a flowchart of a process 400 that includes re-timing a video signal, according to some embodiments. For example, the process 400 may be performed by the custom chip 112 of FIGS. 1 and 2. The custom chip 112 may include logic or logic instructions to perform the process 400. For example, the custom chip 112 may be implemented as an embedded controller, a field programmable gate array (FPGA), a microcontroller with custom firmware, or another type of programmable logic device.

At 402, the process may determine that an input signal is present. At 404, the process may determine whether the input signal is ThunderBolt (TBT) video or DisplayPort (DP) video. If the process determines, at 404, that the input signal is a TBT video signal, then the process proceeds to 406. At 406, the TBT video signal may be re-timed to create a re-timed TBT signal. At 408, the re-timed TBT signal may be output from a USB-C port. For example, in FIG. 1, the custom chip 112 may determine that the TBT-out 104 of the CPU 102 is providing the TBT signal 124 to the custom chip 112. The multiplexer 116 may receive the TBT signal 124 and provide the TBT signal 124 to the re-timer 118. The re-timer 118 may use the external clock 120 to re-time the TBT signal 124 and output the re-timed signal as the video signal 128 from the USB-C port 122 (e.g., using 2 lanes). For example, in FIG. 3, after receiving the TBT signal 124, the custom chip 112 may output the video signal 128 (2 TBT lanes) to either (1) A2 304 and A3 306 or (2) B2 328 and B3 330, depending on the USB-C cable orientation.

If the process determines, at 404, that the input signal is a DP video signal, then the process proceeds to 410. At 410, the DP video signal may be re-timed to create a re-timed DP signal. At 412, a USB-C alternate mode may be specified. At 414, the re-timed DP signal may be output (e.g., using up to 8 pins=4 differential pairs) from a USB-C port. For example, in FIG. 1, the custom chip 112 may determine that the DP-out 108 of the GPU 106 is providing the DP signal 126 to the custom chip 112. The multiplexer 116 may receive the DP signal 126 and provide the DP signal 126 to the re-timer 118. The re-timer 118 may use the external clock 120 to re-time the DP signal 126. The custom chip 112 may instruct the USB-C to use an Alternate mode to output the re-timed signal as the video signal 128 from the USB-C port 122. For example, in FIG. 3, after receiving the DP signal 126, the custom chip 112 may output the video signal 128 (e.g., 4 lanes of DP), using either (1) A2 304, A3 306, B10 344, B11 346 or (2) A10 320, A11 322, B2 328, and B3 330, depending on the USB-C cable orientation.

Thus, the custom chip may support up to 2 lanes of TBT and up to 4 lanes of DP over USB-C. In this way, the DP output of the GPU is not restricted because it is not tunneled into 2 TBT lanes.

Figure 5:
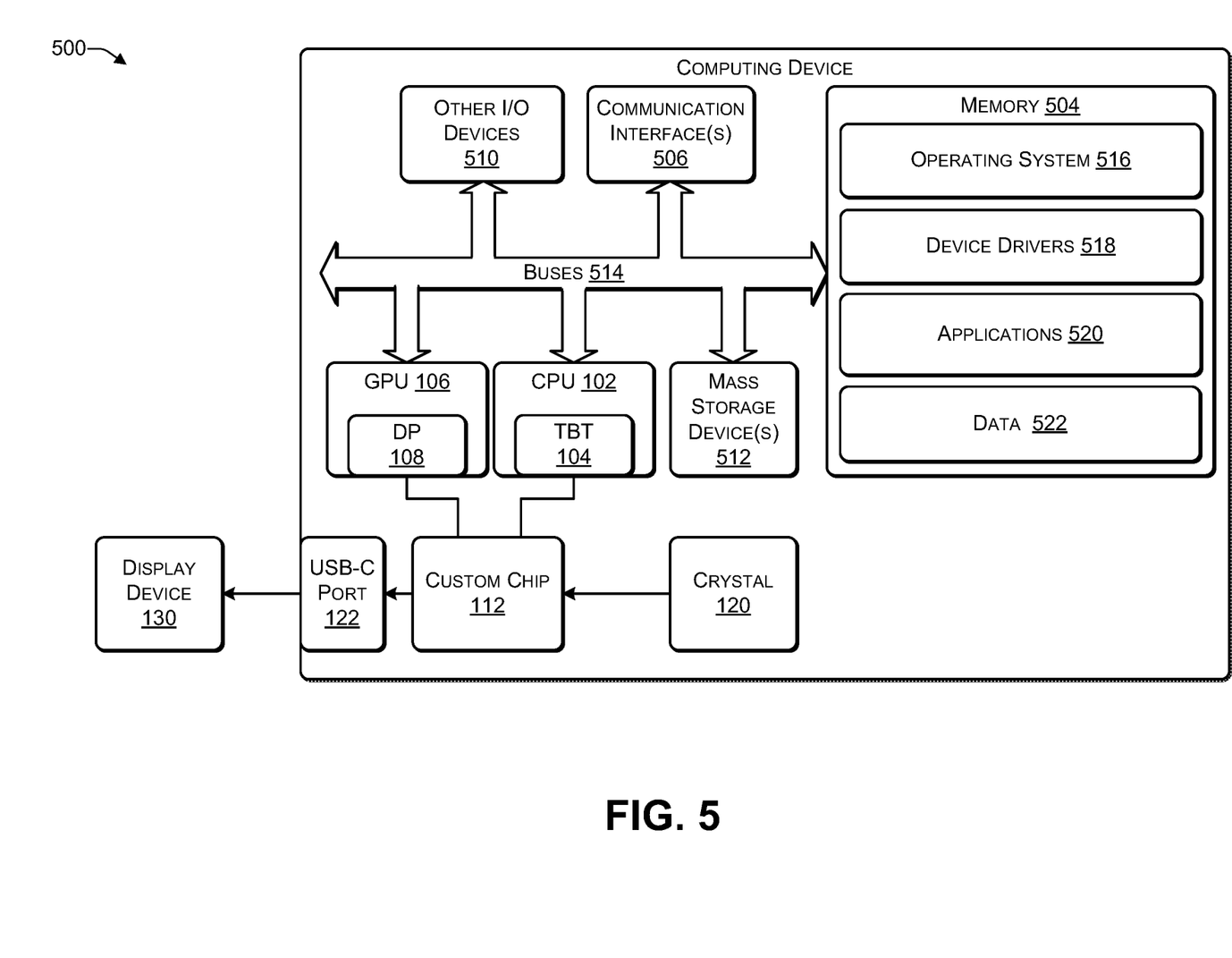
FIG. 5 illustrates an example configuration of a computing device that can be used to implement the systems and techniques described herein.

FIG. 5 illustrates an example configuration of a computing device 500 that can be used to implement the systems and techniques described herein. The computing device 100 may include the CPU 102, the GPU 106, a memory 504, communication interfaces 506, a display device 508, other input/output (I/O) devices 510, and one or more mass storage devices 512, configured to communicate with each other, such as via system buses 514 or other suitable connection. The system buses 514 may include multiple buses, such as memory device buses, storage device buses, power buses, video signal buses, and the like. A single bus is illustrated in FIG. 5 purely for ease of understanding.

The CPU 102 and GPU 106 are one or more hardware devices that may include one or more processing units, all of which may include single or multiple computing units or multiple cores. The CPU 102 and GPU 106 may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU 102 and GPU 106 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processor 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a media capable of storing computer-readable, processor-executable program instructions as computer program code that can be executed by the processor 502 as a particular machine configured for carrying out the operations and functions described in the implementations herein.

The computing device 500 may also include one or more communication interfaces 506 for exchanging data via the network 118 with network elements 516. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 506 can also provide communication with external storage (not shown), such as in a storage array, network attached storage, storage area network, or the like. The display device 130, such as a monitor, may be connected to the computing device 500 in some implementations for displaying information and images to users. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store an operating system 516, device drivers 518, applications 520, and data 522.

If the custom chip 112 determines that the TBT-out 104 of the CPU 102 is providing a TBT signal to the custom chip 112, the custom chip 112 may receive the TBT signal, re-time the TBT signal (e.g., to reduce jitter and/or lag), and output the re-timed signal from the USB-C port 122 (e.g., using 2 lanes=2 differential pairs). If the custom chip 112 determines that the DP-out 108 of the GPU 106 is providing a DP signal to the custom chip 112, the custom chip 112 may receive the DP signal 126 and re-time the DP signal. The custom chip 112 may instruct the USB-C port 122 to use an Alternate mode to output the re-timed signal using 4 lanes=4 differential pairs. Thus, the custom chip 112 may support up to 2 lanes of TBT and up to 4 lanes of DP over USB-C. In this way, the DP output of the GPU is not restricted because it is not tunneled into TBT.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a logic device, that a video signal is present, wherein the logic device is connected to:
      a first type of output interface of a central processing unit that lacks a second type of input interface; and
      a second type of output interface of a graphics processing unit; and
   wherein the video signal comprises either:
      a first type of video signal output by the central processing unit; or
      a second type of video signal output by the graphics processing unit;
   re-timing, by the logic device, the video signal to create a re-timed video signal; and
   outputting, by the logic device, the re-timed video signal over a serial bus port;
   receiving a frequency sweep from a test generator to determine a transmission capabilities of the logic device.

2. The method of claim 1, wherein outputting, by the logic device, the re-timed video signal over the serial bus port comprises:
   determining that the video signal comprises the second type of video signal that is output by the graphics processing unit;
   selecting a mode for the serial bus port; and
   outputting the re-timed video signal using four differential pairs of pins of the serial bus port.

3. The method of claim 2, wherein the re-timed video signal is sent to:
   a 16k display device having a resolution of 15360×8640, at 60 Hertz;
   two 8k display devices, each having a resolution of 7680×4320, at 120 Hertz;
   two 4k display devices, each having a resolution of 3840×2160, at 144 Hertz;
   three 10k display devices, each having a resolution of 10240×4320, at 60 Hertz; or
   three 4k display devices, each having a resolution of 3840×2160, at 90 Hertz.

4. The method of claim 1, wherein outputting, by the logic device, the re-timed video signal over the serial bus port comprises:
   determining that the video signal comprises the first type of video signal output by the central processing unit; and
   outputting the re-timed video signal using two differential pair of pins of the serial bus port.

5. The method of claim 4, wherein the re-timed video signal is sent to:
   a display device having a resolution of 3840×2160 at 120 Hertz; or
   two display devices, each having a resolution of 3840×2160, at 60 Hertz.

6. The method of claim 1, wherein re-timing, by the logic device, the video signal to create the re-timed video signal comprises:
   receiving a timing signal from an external clock; and
   re-timing the video signal using the timing signal to create the re-timed video signal.

7. A computing device comprising:
   a serial bus port;
   a central processing unit that includes a first type of output interface but excludes a second type of input interface;
   a graphics processing unit that includes a second type of output interface; and
   a logic device configured to perform operations comprising:
      determining that a video signal is present, wherein the video signal comprises either:
         a first type of video signal output by the central processing unit; or
         a second type of video signal output by the graphics processing unit;
      re-timing the video signal to create a re-timed video signal; and
      outputting the re-timed video signal from the serial bus port;
   wherein re-timing, by the logic device, the video signal to create the re-timed video signal comprises:
      receiving a timing signal from an external clock; and re-timing the video signal using the timing signal to create the re-timed video signal.

8. The computing device of claim 7, wherein outputting the re-timed video signal from the serial bus port comprises:
   determining that the video signal comprises the second type of video signal output by the graphics processing unit;
   selecting a mode for the serial bus port; and
   outputting the re-timed video signal using up to four differential pairs of the serial bus port to provide up to four lanes.

9. The computing device of claim 8, wherein the re-timed video signal is sent to:
   a 16k display device having a resolution of 15360×8640, at 60 Hertz;
   two 8k display devices, each having a resolution of 7680×4320, at 120 Hertz;
   two 4k display devices, each having a resolution of 3840×2160, at 144 Hertz;
   three 10k display devices, each having a resolution of 10240×4320, at 60 Hertz; or
   three 4k display devices, each having a resolution of 3840×2160, at 90 Hertz.

10. The computing device of claim 7, wherein outputting the re-timed video signal over the serial bus port comprises:
    determining that the video signal comprises the first type of video signal output by the central processing unit; and
    outputting the re-timed video signal using two differential pairs of the serial bus port.

11. The computing device of claim 10, wherein the re-timed video signal is sent to:
    a display device having a resolution of 3840×2160 at 120 Hertz; or
    two display devices, each having a resolution of 3840×2160, at 60 Hertz.

12. A custom chip comprising:
    a multiplexer connected to:
      a first type of output interface of a central processing unit that lacks a second type of input interface; and
      a second type of output interface of a graphics processing unit; and
    a re-timer;
    wherein the custom chip is configured to:
      determine that a video signal is present, wherein the video signal comprises either:
        a first type of video signal output by the central processing unit; or
        a second type of video signal output by the graphics processing unit;
      re-time, by the re-timer, the video signal to create a re-timed video signal; and
      send the re-timed video signal to a serial bus Type C port;
      receiving a frequency sweep from a test generator to determine a transmission capabilities of the logic device.

13. The custom chip of claim 12, wherein sending the re-timed video signal to the serial bus port comprises:
    determining that the video signal comprises the second type of video signal that is output by the graphics processing unit;
    selecting a mode for the serial bus port; and
    sending the re-timed video signal using up to four differential pairs of pins of the serial bus port.

14. The custom chip of claim 13, wherein the re-timed video signal is sent to:
    a 16k display device having a resolution of 15360×8640, at 60 Hertz;
    two 8k display devices, each having a resolution of 7680×4320, at 120 Hertz;
    two 4k display devices, each having a resolution of 3840×2160, at 144 Hertz;
    three 10k display devices, each having a resolution of 10240×4320, at 60 Hertz; or
    three 4k display devices, each having a resolution of 3840×2160, at 90 Hertz.

15. The custom chip of claim 12, wherein sending the re-timed video signal to the serial bus port comprises:
    determining that the video signal comprises the first type of video signal output by the central processing unit; and
    sending the re-timed video signal using two differential pairs of pins of the serial bus port.

16. The custom chip of claim 15, wherein the re-timed video signal is sent from the serial bus port to:
    a display device having a resolution of 3840×2160 at 120 Hertz; or
    two display devices, each having a resolution of 3840×2160, at 60 Hertz.

17. The custom chip of claim 12, wherein re-timing the video signal to create the re-timed video signal comprises:
    receiving a timing signal from an external clock; and
    re-timing, using the re-timer, the video signal using the timing signal to create the re-timed video signal.

* * * * *

UNITED STATES PATENT AND TRADEMARK OFFICE
CERTIFICATE OF CORRECTION

PATENT NO. : 10,990,550 B1
APPLICATION NO. : 16/815050
DATED : April 27, 2021
INVENTOR(S) : Randall E. Juenger et al.

Page 1 of 1

It is certified that error appears in the above-identified patent and that said Letters Patent is hereby corrected as shown below:

In the Claims

Column 14, Line 5 in Claim 12: Please change "serial bus Type C port" to --serial bus port--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*